Aug. 17, 1943.   H. R. ETZLER   2,326,845
INSECT CATCHER
Filed Feb. 10, 1942   2 Sheets-Sheet 1
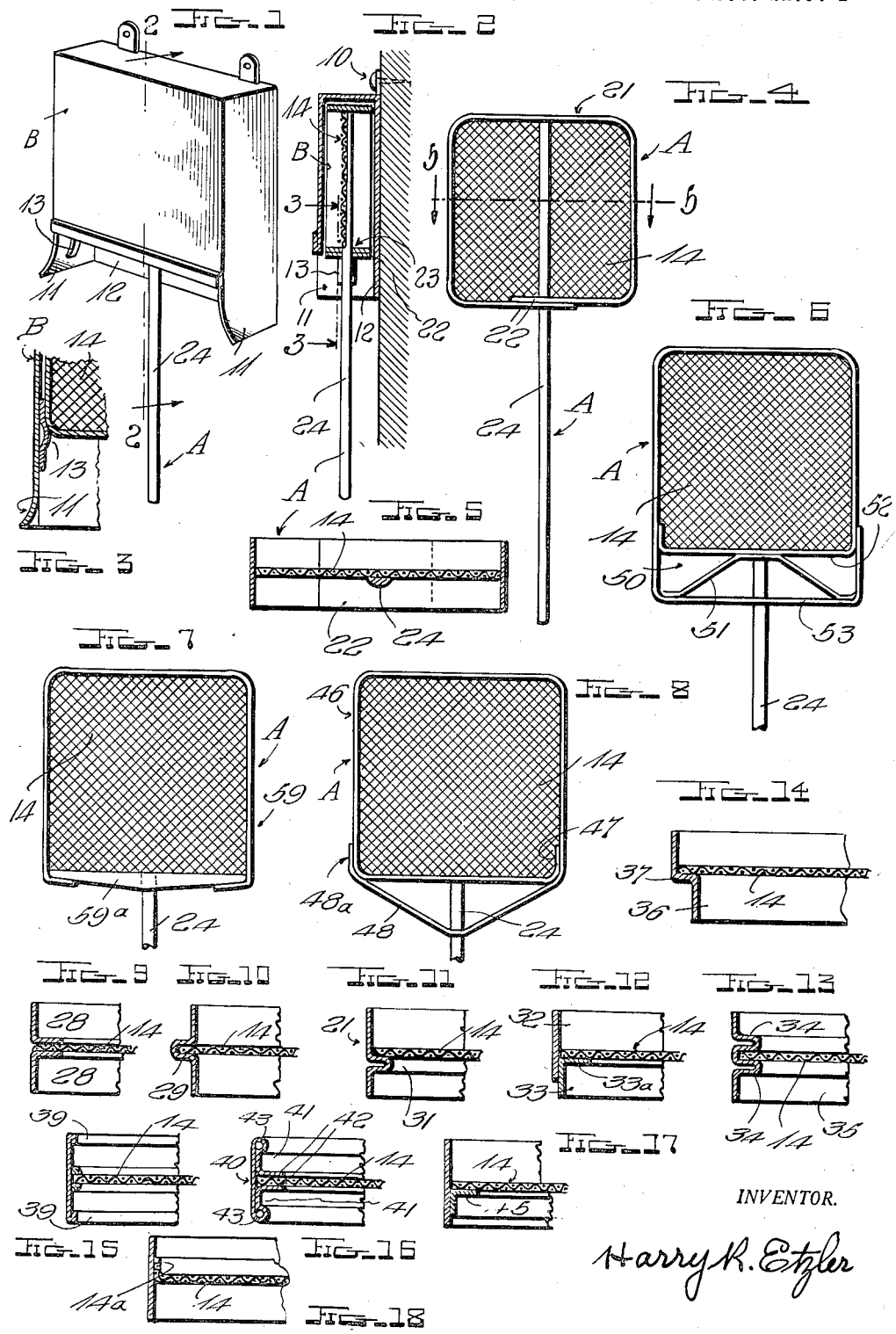
INVENTOR.
Harry R. Etzler

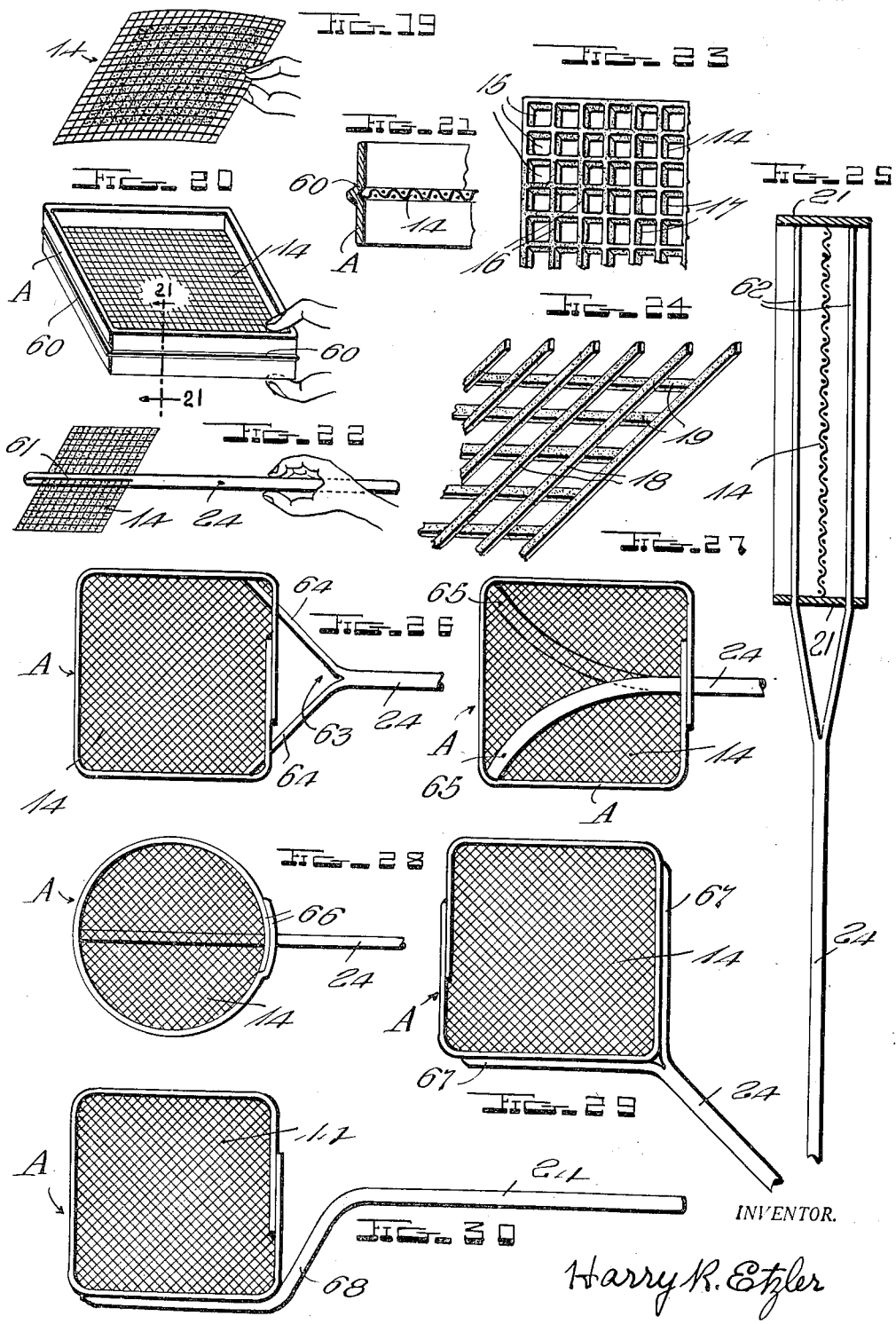

Patented Aug. 17, 1943

2,326,845

UNITED STATES PATENT OFFICE 2,326,845

INSECT CATCHER

Harry R. Etzler, Mount Clemens, Mich.

Application February 10, 1942, Serial No. 430,291

5 Claims. (Cl. 43—136)

This application is a continuation in part of my prior application for patent for Fly catcher, filed October 6, 1940, Serial No. 359,961, allowed July 11, 1941, and abandoned in favor of my copending application, Ser. No. 419,188, filed November 14, 1941, and the present application, which is a division of said application, Ser. No. 419,188.

This invention relates to an insect catcher and receptacle therefor, and especially to a manually operable catcher device having an insect entangling surface and to be wielded through the air and manipulated to contact and entangle flying insects upon its entangling surface, and a receptacle for receiving the catcher and in which the catcher may be held and kept out of sight when not in use but in such manner as to be immediately available for ready removal and use.

I am aware that fly swatters and sprays are used for catching such insects and, while these have been generally successful in operation, they have also been found objectionable. In the use of both swatters and sprays the insects have to be collected and disposed of and often fall unnoticed into food material in the kitchen, on the dining table, etc., proving a quite unappetizing spectacle to contemplate. The swatters usually maim or crush the insect, with consequent soiling and disfiguring of the object on which they are swatted, and it is usually a mangled insect that must be disposed of and the question arises where to dispose of it. The swatter device becomes polluted, retaining this repulsive aspect. Sprays are costly, are not always at hand for use, produce nauseating and irritating fumes and often the insects are not destroyed but merely stupefied and must be gathered up and disposed of before they regain consciousness again.

In the particular art pertaining to devices comprising an entangling sheet which is designed to be wielded through the air, no devices, so far as I am aware, have been developed which overcome the foregoing objections and various difficulties which prevent their general adoption, due, I believe, to the fact that such devices have always depended as an essential element upon the use of an entangling sheet of ordinary flimsy fly paper, or other sticky surfaced material requiring extra means for maintaining it extended operatively disposed in a carrier. It usually requires considerable dexterity to place and replace the entangling element in order to prevent soiling of the fingers or other articles. Such devices have usually been heavy, costly, clumsy or unsightly, and generally capable of one way operation in presenting but a single entangling surface facing in one direction for use. In no case, so far as I am aware, has any prior device embodied an entangling sheet or element and shield of light material or materials and wherein the sheet has form supporting properties to support the shield and sustain its own shape and that of the shield.

My invention provides valuable new features in an entangling element, permitting a light weight and low cost device to be produced, and a novel receptacle for keeping the device when not in use, both of which will deal with the house fly and mosquito pest in a more satisfactory manner than has been heretofore possible with prior devices.

The light weight offered by my structural design, due mainly to the inherent form-supporting character of my entangling sheet, is essential to the success of the device, in that its light weight diminishes the danger of destructive impact, and allows for freer and more accurate operation of the device with less fatigue and, added to the soft and harmless character of its exterior parts, regular profile, quiet action, and other desirable features employed, bring about a set of correlated properties conducive to efficient wielding and catching actions, considerations which were unforeseen in the prior art and which largely contributed to the failure of prior devices. My structural design in addition to providing a catcher of light weight and inexpensive of construction, also provides one which is made of low resistance to passage through the air, and least liable to disturb the air or move the air before it, so as not to warn the insects and allow them a better chance of escape.

It is one object of this invention to provide a practical device by the use of which an insect may be caught while in flight and disposed of without soiling the surface upon which the insect was resting just prior to the time it was caught.

Another object of my invention is to provide a receptacle of a simple form preferably to be fastened to a wall or other surface and have sheltering and guiding means to facilitate the insertion of the catcher and means to retain the latter, which receptacle is of pleasing appearance and adapts the device to be kept in a safe place where it may be easily found for use and replaced after use.

I further aim to provide a quiet-acting catcher device and one having an outline which is less likely to catch onto and pull other objects out of place and also one having small mass, thus allowing of its free and rapid operation and reducing to the minimum liability of injury thereto by contact with other objects.

A further object of my invention is to provide a catcher using a marginal shield of light weight material for the entangling sheet, which has no harsh exterior so that it cannot scratch or mar any surface which it contacts, utilizing the stiffness of the entangling sheet for the support and shaping of the shield and the maintenance of its shape, and preferably employing a handle attached to either the shield or the entangling sheet, or both, and in some instances interconnected with such parts in a novel manner so as to secure requisite strength.

A still further object of my invention is to provide an entangling unit insert, for a refillable type of catcher device, which is stiff and form-sustaining, making it more convenient to handle in placing it in and removing it from the device.

A still further object of my invention is to provide a non-reconditionable type of catcher device which may be discarded on occasion, instead of reconditioning, without sacrificing economy in doing so and one also which as a whole may be quite readily disposed of by incineration or other manner.

The principle of the improvement over the prior art which my invention furnishes is a light weight, stiff, form-sustaining entangling sheet, vital to securing lightness, low cost, efficiency, safety, and to the general practicability of all the various types I mention employing it, as their superior structure and qualities are due to its embodiment, either as a replaceable or as a fixed member, and in whatever manner a handle is applied to the device. The innovation of this feature to the art of aggressive insect catcher device to wield in the air, brings radical departure from the old principle of structural function and, considering its accomplishments, deserves the consideration of those interested in the arts advancement.

An additional feature of my insect catcher set is the receptacle part which solves the problem of having around a transferable sticky surface, by furnishing safe protection from the device while the device is not in use.

I further provide, in all examples, exceedingly simple and inexpensive constructions which are to be taken as representative rather than limitary, and which may be used in their manufacture readily adaptable inexpensive products like crude fabric, paper and wood.

My device is manually operated. A person grasps the device and waves it broad side, to and fro, through the air, where the insect is flying, manipulating it to touch the insect with the entangling surface of the device. In case a fly is resting on an object, the entangling sheet is brought to sweep past and close by the surface, thus frightening the insect and causing it to fly off into the air in front of the approaching entangling sheet and to be touched and caught by it, and, in the event flies are in secure locations, the operator's idle hand may be used to shoo the insect out into the open so that the operator may subsequently contact them with the device.

Various additional objects and advantages will, in part, become apparent from a consideration of the following description, taken in connection with the accompanying drawings, wherein:

Figure 1 is a perspective view of the receptacle as it appears when hung on a wall, with the catcher in its proper place therein.

Figure 2 is a vertical section taken on the line 2—2 of Fig. 1.

Figure 3 is a detail section taken on the line 3—3 of Fig. 2.

Figure 4 is a face or plan view of one type of catcher.

Figure 5 is a cross section on the line 5—5 of Fig. 4.

Figure 6 is a plan view showing a modified form of catcher.

Figure 7 is a plan view of another modified form of catcher showing an extra staunch section of the shield to support the handle.

Figure 8 is a plan view of still another modified form of catcher, showing another mode of attaching the handle.

Figures 9, 10, 11, 12, 13, 14, 15, 16, 17 and 18 are fragmentary sectional views which disclose modified forms of shields and means whereby the entangling sheet is held thereby.

Figure 19 is a perspective view showing the use of an entangling sheet as an insect catcher without a marginal shield as a carrier.

Figure 20 is a perspective view showing the use of an entangling sheet with a marginal shield, but without a handle.

Figure 21 is a detail section, taken on the line 21—21, of Fig. 20.

Figure 22 is a perspective view showing the entangling sheet attached to a handle and used as a catcher without a marginal shield as a carrier.

Figure 23 is a fragmentary perspective view of one form of the entangling sheet.

Figure 24 is a fragmentary perspective view showing another form of the entangling sheet.

Figure 25 is a vertical sectional view showing still another type of the catcher having a shield and a specific form of handle.

Figures 26, 27, 28, 29 and 30 are plan views showing further modified ways of attaching the handle.

Referring now more specifically to the drawings, wherein like characters designate like parts throughout the several views, attention is directed to the fact that while I cannot illustrate all the forms which the scope of my invention includes and which originate and develop from and depend upon the embodiment of my light weight, intrinsic form supporting entangling element, it is to be borne in mind that the invention is not limited to the forms herein shown and that the illustrated forms are simply exemplifications of some of the many and various forms or modifications which the invention may embrace.

In Figures 1 to 3, the insect catcher set, as a whole, is illustrated, and it consists of a catcher of the form shown in Fig. 4 which, as a whole, is designated A, and a receptacle which, as a whole, is designated B.

This receptacle is usually fastened, as at 10 in Figure 2, preferably reasonably high on a wall and may be in a conspicuous location so that the catcher A may be readily inserted therein and removed therefrom through its open bottom or mouth, aided by flaring side guides 11 at the lower ends of the side walls of the receptacle and a rear guide 12 formed by or upon the rear wall of the receptacle and which parts 11 and 12 extend below the opening of the receptacle. I do not limit myself to the material of which the receptacle B is made, nor to the specific configuration thereof. It may be made of paper which will afford sufficient resilient action to grip and retain the catcher A. I may also use, for the same purpose, retaining elements made of strips of stiff paper, such as cardboard, humped to provide resilient retaining shoulders, as at 13, and glued to the receptacle or formed integral therewith.

The catcher A, in all forms, employs a light weight sheet of entangling material, designated as at 14. This sheet 14 is preferably of openwork or open-mesh formation, and one form may be a sheet of textile or other fabric which is stiffened in any desirable manner to render it form-sustaining. This sheet may be woven and, to impart stiffness to it, may be subjected to a coating or impregnation with any appropriate material. Or, this sheet may be fabricated from parts that are in themselves stiff or form-sustaining, or this sheet may be formed from papier-mâché, or from plastic or synthetic material. In all instances, the sheet 14 will have applied to, over, or along its surfaces, a suitable insect entangling material, such as a coating of a sticky material or substance.

In Figures 1 to 5 a shield 21 surrounds the sheet 14, the latter being marginally glued or in any manner attached to the shield 21, intermediate the opposite marginal edges of the latter, the shield having its ends overlapping, as at 22, and glued together, if desired, and both provided with an opening 23 through which the manipulating handle 24, usually of wood, passes, and as shown in this instance the handle is reduced to one-half section within the shield, as seen in Figures 2 and 5, at the points of contact with the shield, being glued or otherwise fastened to the shield. Such shield 14, in the present instance, and in all instances where I refer to a shield in the specification, may be made of paper, or other suitable material. This strip of paper or other material in this particular form of the device is made to fit about the entangling sheet, and its edges are in spaced relation to the entangling sheet to cause it to project out from opposite side faces of the entangling sheet so that when the catcher is set upon a table or the like, the entangling sheet will be held in spaced relation to the surface upon which the device rests and the surface will not be marred by contact with any part of the sheet or the efficiency of the sheet impaired. That portion of the handle that extends across the entangling sheet gives added strength to the device and it also serves to help brace and secure the outward extending part of the handle to the body of the device, the stiffness and form sustaining qualities of the entangling sheet imparting shape to the shield 21 and maintaining the shield in shape and against movements in any direction tending to distort it.

In the type of Figures 1 to 5, and all other forms, it is to be understood that where the handle has a portion extending over and touching the entangling sheet, the entangling material may also be placed on that portion of the handle which then becomes part of the entangling element.

Figure 6 discloses a construction in which the shield disposed about the entangling sheet is extended to form a rectangular outer part comprising the space designated as at 50 within which a brace 51 is fastened to opposed strip portions 52 and 53. The handle 24 passes through the portions 53 and is secured at the junction of the portions 51 and 52.

In the type shown in Figure 7, the shield consists of a strip 59 having its ends fastened to a stouter strip or bar 59a of balsam wood or other light material. Usually the handle 24 is appropriately fastened to the center of the bar.

In Figure 8 the shield designated as at 48 marginally embraces and is glued or otherwise fastened to the sheet 14. The shield is formed of a single strip which extends about the margin of the sheet and has one end lapped and glued or otherwise fastened, as shown at 47, an extended end portion of the strip being bent to form a yoke 48 and again fastened to the shield part as shown at 48a. The yoke which projects rearwardly of the shield is tapered rearwardly and, at its apex, it is perforated to receive the handle 24 which has its front end secured to the shield.

In Figures 9 to 18 are shown various modifications showing how the shield 21 and the entangling sheet may be assembled in relation to each other.

In Figure 9 the sheet 14 is glued between two inwardly extending flanges of strips 28 formed in the coacting halves of a two-part shield.

In Figure 10 the sheet 14 is inserted in an outward U-shaped recess 29 in the shield, in which it may be glued if desired.

In Figure 11 the shield 21 has an inwardly depressed rib 31 against either side of which the sheet 14 may be placed and to which it may be secured.

In Figure 12 the shield has two coacting sections 32 and 33 glued together, part of the section 33 being bent to form a ledge 33a against which the sheet 14 is placed.

In Figure 13 the sheet 14 is either permanently or removably mounted in a groove between ledges 34 formed by inwardly crimped portions of the strip of which the shield 35 is formed.

In Figure 14 the shield 36 has an offset shoulder 37 on which the sheet 14 is placed.

In Figure 15 the sheet 14 is marginally glued or otherwise fastened to the inside wall of a plane strip forming the shield, said strip having marginal reinforcing beads 39 which stiffen the edges of the shield.

In Figure 16 the shield strip 40 is bent upon itself as at 41 and formed with flanges 42 between which the sheet 14 is placed. The outer edges of strip 40 constitute reinforcing beads 43 which provide smooth and rounded edges.

In Figure 17 the shield has an angle strip of paper 45 glued to it, on which the sheet 14, in turn, is placed.

Figure 18 shows another modification of attaching the sheet 14 to the shield, the sheet 14 being provided with a laterally bent flange 14a which is glued to the shield.

In Figure 19 I show a stiff and form-sustaining entangling sheet with a marginal portion thereof free from entangling material, the sheet 14 being grasped at the margin thereof making it obvious that it, by itself, actually may serve as and constitute an insect catcher device which can be used by being held with the fingers and moved back and forth in a sweeping manner to contact and thereby catch insects while they are flying in the air.

In Figure 20 I show the entangling sheet 14 provided with a shield A comprising a strip, in this instance fitted about the margins of the sheet and which projects outwardly from opposite sides faces of the sheet 14 in spaced relation to the entangling surfaces of the sheet in order that it be safer, in operation and otherwise, against contacting and soiling other articles with the entangling material of the sheet. This shield A has a circumferential crease or groove 69 to receive and brace the edges of the sheet. I also illustrate in Figure 20 how the sheet with the shield fitted about and attached to it may be grasped and used as an insect catcher device, and wielded through the air to touch flying insects with the entangling sheet. The shield 21 may be formed from a paper strip or other appropriate light weight material as a consequence of its being supported in shape by the intrinsic form-supporting qualities of the entangling sheet 14, and both the sheet and the shield cooperate interactingly to support the shape of the device and the respective parts thereof.

In Figure 21 I show in detail how the shield in Figure 20 is provided with an internal circumferential groove 60 formed in the shield A and into and along which the edges of the sheet 14 are glued or otherwise confined.

In Figure 22 I disclose how the sheet 14 per se may be simply attached to a handle 24 by inserting the sheet in a slit provided in the forward part of the handle, showing how this stiff and form-sustaining entangling sheet with a handle, alone, attached to it may be used for and constitutes an insect catcher, without additional parts to carry the sheet 14.

Figure 23 discloses a modified form of my entangling sheet 14 wherein the elements which provide cellular construction having the open mesh walls 16 made up of strips or the like which form partitions of greater depth than its wall thickness. In this form of the invention the entangling material 17 may also take the form of a coating on the side faces of the partitions within the meshes 15.

In Figure 24 I show another form of entangling sheet consisting of strips, strands or threads 18 crossed by superposed strips, strands or threads 19 glued thereto, and all members as well as those of Figure 23, suitably stiffened to be form-sustaining. The sheet shown in Figure 24 is of open-mesh form and the entangling material may be applied to any or all surfaces of the formed sheet by spraying the entangling material on the sheet, or by other means. The structure of both Figures 23 and 24 may be made of one or more parts of material, or it may be moulded, stamped, rolled, or otherwise formed from papier-mâché, plastics or other appropriate materials.

The type of catcher shown in Figure 25, which also depends upon my stiff form-supporting entangling sheet, differs from the other types mainly in that the handle 24 is slit, as shown, and has spaced apart portions 62 passing through openings at one side of the shield 21 and, at its free ends, is attached to the confronting portions of the shield. Portions 62 are located on opposite sides of, and spaced from, the sheet 14 which, as usual, is held in fixed relation in engagement with the inner sides of the shield 21.

In Figure 26 I have shown another type of the catcher using my novel entangling sheet 14. I show the handle 24 forked, as at 63, and the forked portions 64 are shown attached to the shield at or near the corners and engaging both members at the corners in order to establish and maintain a rigid unit.

The type shown in Figure 27 using my novel entangling unit, is of the construction similar to that shown in Figure 4, but the handle 24 has its portion within the shield formed with arms 65 which are curved longitudinally and diverge forwardly at a tangent to each other. These arms are attached to opposite faces of the sheet 14 and, at their free ends, may also be glued to the shield.

In Figure 28 I have shown a catcher type of substantially circular configuration, this type being a modification in shape mainly from the type shown in Figure 4. The overlapping ends 66 of the shield 21 is a peculiarity of the several types shown here and in Figures 29 and 30, but is not an essential method of binding the ends of a strip used to form a shield for the sheet of my invention.

In Figure 29 I show a handle 24 split as shown and the resulting legs 67 fastened to the outside of the shield 14.

In Figure 30 I show the handle 24 provided with an offset portion as at 68 which in turn is fastened to the shield 21.

I intend to make it clear here that the novel feature of my stiff and form-sustaining entangling sheet is inherently self-sustaining to maintain all of its portions in the same plane as in the sheet examples shown in Figures 19 and 22. The same is true with regard to the construction shown for example in Figure 24, where the sheet is formed of cross strips, except that it would be necessary to glue or otherwise fasten strips 19 in fixed angular relation to strips 20 in order to maintain the contour of the sheet and prevent angular shift of the strips and/or distortion of the contour of the sheet as a whole. This self-sustaining feature of the sheet also acts, as in case of such a structure shown in Figure 20, employing a marginal shield, to sustain the shield, which is of importance, for example in the case of a rectangular stiff and form-supporting sheet having a relatively frail shield strip, such paper, fitting about its margins the stiffness and form-supporting properties of the sheet would constrain the shape of the shield to the rectangular shape of the sheet, and the sheet and shield would coact to mutually brace each other against warping movements, even though the sheet were not glued or fastened to the shield but only engaged therein as a removable part.

If, on the other hand, the entangling sheet were composed of wire mesh material, such as wire gauze as it is known in the hardware trade, without extra treatment to fix the angular relationship of the crossing wires, such a sheet would easily become distorted to another misshaped form and a non-rigid shaped shield would follow it, even if the wires of the sheet were stiffer than that of wire gauze gage. My construction, therefore, allows materials weaker and stronger than wire gauze to be used without being subject to the stated objections. In connection with the latter consideration it will be noted than even ordinary flimsy fly paper possesses the property that is lacking in wire gauze of maintaining lateral fixed relative positions of its component parts as long as it retains a flat form.

Another advantage incident to the stiff and form supporting properties of my entangling sheet is that the stiffness of the sheet serves to hold the distance apart of the sections of the shield which are fitted along different sections of the margin of the sheet, holding them away from each other and against collapsing inwardly toward each other, or keeping them distended, as appears obvious from the structure shown in Figure 5, and generally all the other types disclosed, thus doing away with the necessity of using a rigid form of shielding frame and allowing the use of inferior materials in forming the shield or a shield construction inferior in circumferential rigidity, i. e., one with a shape not secure in itself but dependent upon that of the sheet, this being true even though the shield be not glued or rigidly fixed to the sheet. Thus, for example, materials of the rigidity of a fair grade of ordinary wrapping paper may be used in making a strip to be used for a shield.

By the terms or expressions "fibrous," "cellulosic," "paper" or "synthetic plastic" materials herein used I mean any of these materials or the derivatives of their bases or any equivalent materials.

It will be understood that I have made the foregoing disclosures by way of examples only, and that none of them are to be taken as limitations of the scope of my invention except when expressly defined in the appended claims.

What I claim is:

1. An insect catcher comprising a relatively stiff substantially flat body portion formed of interwoven mesh fibrous material, insect entangling substance on opposite sides of said body portion, a guard formed of relatively flexible substantially non-porous material secured to and surrounding the body portion and extending in opposite directions from the surface thereof to protect the insect entangling substance on opposite sides of the body portion, the relatively flexible guard being stiffened and held distended by engagement with the body portion, and a handle secured to the insect catcher to facilitate manipulation thereof.

2. An insect catcher comprising a relatively stiff blade formed of inexpensive interwoven material having insect entangling substance applied thereto, a guard of inexpensive relatively flexible fibrous material surrounding the blade and extending in opposite directions therefrom in planes substantially perpendicular to the surface of the blade to protect the insect entangling surface of the blade, and a handle secured to and extending laterally from the insect catcher to facilitate manipulation thereof.

3. An insect catcher comprising a relatively stiff substantially flat body portion formed of light weight material, insect entangling substance on opposite sides of said body portion, a relatively flexible guard formed of light weight sheet material fitting about the body portion and extending in opposite directions from the surface thereof to protect the insect entangling substance on opposite sides of the body portion, the relatively flexible guard being stiffened and supported in shape by engagement with the body portion, and a handle secured to the insect catcher to facilitate manipulation thereof.

4. An insect catcher comprising a relatively stiff and self-form supporting substantially flat body portion, insect entangling substance on opposite sides of said body portion, a light weight shield formed of a strip of paper fitting about the border and secured in fixed position to said body portion and having parts extending in opposite directions from the surface thereof in planes substantially perpendicular to the entangling surface of said body portion in shielding relation thereto, said shield portion being stiffened and supported in shape by engagement with the stiff body portion, and a handle secured to and extending laterally from the insect catcher to facilitate manipulation thereof.

5. An insect catcher comprising a relatively stiff blade formed of inexpensive light weight porous sheet material having insect entangling substance on opposite sides thereof, a light weight paper guard fitting about the border of the blade and having parts extending in opposite directions therefrom in planes substantially perpendicular to the surface of the blade and supported in shape by engagement with the blade to shield the insect entangling surface of the blade, and a handle secured to and extending laterally from the insect catcher to facilitate manipulation thereof.

HARRY R. ETZLER.